(12) United States Patent
Han

(10) Patent No.: US 9,749,214 B2
(45) Date of Patent: Aug. 29, 2017

(54) SOFTWARE DEFINED NETWORKING (SDN) SPECIFIC TOPOLOGY INFORMATION DISCOVERY

(71) Applicant: Futurewei Technologies, Inc., Plano, TX (US)

(72) Inventor: Lin Han, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 480 days.

(21) Appl. No.: 14/191,121

(22) Filed: Feb. 26, 2014

(65) Prior Publication Data

US 2015/0244607 A1 Aug. 27, 2015

(51) Int. Cl.
*H04L 12/751* (2013.01)
*H04L 12/715* (2013.01)
*H04L 12/717* (2013.01)
*H04L 12/721* (2013.01)

(52) U.S. Cl.
CPC ............ *H04L 45/02* (2013.01); *H04L 45/04* (2013.01); *H04L 45/42* (2013.01); *H04L 45/46* (2013.01); *H04L 45/64* (2013.01); *H04L 45/38* (2013.01)

(58) Field of Classification Search
None
See application file for complete search history.

(56) References Cited

U.S. PATENT DOCUMENTS

2001/0032272 A1* 10/2001 Fujita .................. H04L 45/302
709/241
2013/0039214 A1* 2/2013 Yedavalli .............. H04L 45/025
370/254
2013/0223226 A1 8/2013 Narayanan et al.
2013/0266007 A1* 10/2013 Kumbhare .............. H04L 45/56
370/389
2013/0329601 A1 12/2013 Yin et al.

FOREIGN PATENT DOCUMENTS

CN 103501236 A 1/2014
WO 2015124099 A1 8/2015

OTHER PUBLICATIONS

J. Moy, OSPF Version 2, Apr. 1998, Network Working Group pp. 26-35, 190-191, Figures 1-8, Table 1-5.*

(Continued)

*Primary Examiner* — Hicham Foud
*Assistant Examiner* — Ayanah George
(74) *Attorney, Agent, or Firm* — Conley Rose, P.C.

(57) ABSTRACT

Disclosed herein is a mechanism for discovering SDN specific topology information in a SDN interconnection network. SDN specific topology information may comprise SDN IDs, SDN member router ID lists, and SDN address lists. A SDNC associated with a local SDN domain in the SDN interconnection network may determine a set of routers and/or links in the local SDN domain for link advertisement and may associate the set of routers with the local SDN domain. The SDNC may further determine a set of border routers in the local SDN domain for broadcasting the link advertisements and SDN specific topology information to other interconnected SDN domains. The SDNC may receive link advertisement and SDN specific topology information from other interconnected SDN domains and may compute a best path through each router and/or link across the SDN domains.

19 Claims, 13 Drawing Sheets

(56) References Cited

OTHER PUBLICATIONS

Foreign Communication From a Counterpart Application, PCT Application No. PCT/CN2015/073260, International Search Report dated May 28, 2015, 7 pages.
Foreign Communication From a Counterpart Application, PCT Application No. PCT/CN2015/073260, Written Opinion dated May 28, 2015, 4 pages.
Oran, D., "OSI IS-IS Intra-domain Routing Protocol", RFC 1142, Feb. 1990, 157 pages.
Moy, J., "OSPF Version 2", RFC 2328, Apr. 1998, 244 pages.
Coltun, R., "OSPF for IPv6", RFC 5340, Jul. 2008, 94 pages.
"QoS-aware Network Operating System for Software Defined Networking with Generalized OpenFlows," XP055054272, IEEE Network Operations and Management Symposium, Jun. 8, 2012, 1167-1174.
Foreign Communication From a Counterpart Application, European Application No. 15755937.8, Extended European Search Report dated Jan. 25, 2017, 11 pages.

* cited by examiner

1100

1200

SOFTWARE DEFINED NETWORKING (SDN) SPECIFIC TOPOLOGY INFORMATION DISCOVERY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional computer networks may be built from a large number of network devices, such as routers, switches, and/or other hardware, which may require manual configurations and managements. Software defined networking (SDN) is a networking paradigm in which data forwarding (e.g. data plane) may be decoupled from control decisions (e.g. control plane), such as routing, resources and other management functionalities. The decoupling may also allow the data plane and the control plane to operate on different hardware, in different runtime environments, and/or operate using different models. In an SDN network, network intelligence may be logically centralized in software-based controllers. Thus, network devices may become packet forwarding devices that may be managed and controlled by the centralized controllers.

SUMMARY

A SDN specific topology information discovery mechanism is disclosed herein. In one example embodiment, a software defined networking controller (SDNC) associated with a local SDN domain in an SDN interconnection network may exchange SDN specific topology information with other interconnected SDN domains. In this example embodiment, the SDNC may determine a first set of local network devices, local links, and/or local SDN specific topology information for advertisement to a remote SDN domain in the SDN interconnection network. The local SDNC specific topology information may include an SDN identifier (ID) that identifies the local SDN domain, a SDN member router ID list that identifies the set of local devices in the local SDN domain, and a SDNC address list that identifies a set of SDNCs in the local SDN domain. The SDNC may further determine a second set of network devices positioned at a border of the local SDN domain for communication with the interconnected SDN domains. When the SDNC receives SDN specific topology information of the interconnected SDN domains, the SDNC may determine a route for packet delivery in the SDN interconnection network according to the received SDN specific topology information and the local SDN specific topology information.

In another example embodiment, a network device positioned at a border of a local SDN domain in an SDN interconnection network may be instructed by a SDNC associated with the local SDN domain to communicate with other interconnected SDN domains. In this example embodiment, the network device may receive SDN specific topology information of the local SDN domain from the SDNC over a controller-device interface. Upon receiving the local SDN specific topology information, the network device may advertise the local SDN specific topology information to an interconnected SDN domain over an inter-domain connection.

In another example embodiment, an Intermediate System-to-Intermediate System (IS-IS) protocol may be extended to support SDN specific topology information exchange for inter-domain routing. In this example embodiment, the IS-IS link state packet (LSP) may be extended to carry SDN specific topology information, such as SDN ID, SDN member router ID list, and/or SDNC address list.

In yet another embodiment, an Open Shortest Path First (OSPF) protocol my be extended to support SDN specific topology information exchange for inter-domain routing. In this example embodiment, the OSPF version 2 (v2) opaque link state advertisement (LSA) or the OSPF version 3 (v3) new LSA may be extended to carry SDN specific topology information, such as SDN ID, SDN member router ID list, and SDNC address list.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
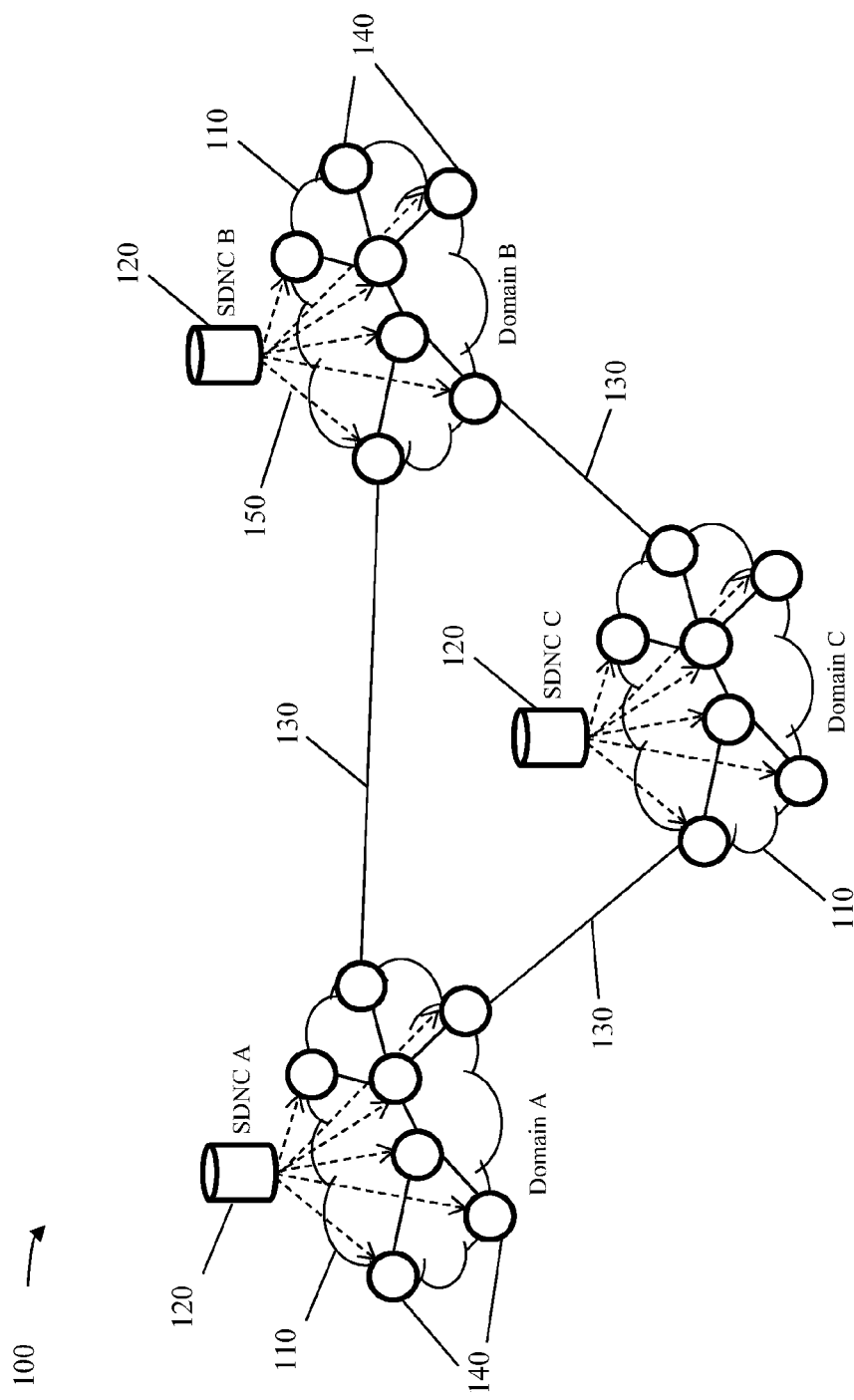
FIG. 1 is a schematic diagram of an example embodiment of an SDN interconnection network.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some networks, routers and switches may be placed and configured in a way that defines the flow of data in a network. Subsequent changes to the routers and/or switches may be expensive as physical locations and/or hardware may require manual configurations. SDN is a networking paradigm, where the management of data flow (e.g. control plane) and the delivery of data (e.g. data plane) may be decoupled, which may create a flexible network through dynamic management and control. In an SDN network, network devices (e.g. routers and/or switches) may be controlled and managed by one or more SDNCs. The SDNCs may make routing decisions and then communicate the routing decisions to the network devices. For example, the SDNCs may compute the best paths for routing packets from one node to another node based on some network topology information and then download route tables, switching tables, or flow tables to all network devices along the best path. Then, the network devices may perform data forwarding functions according to the route tables received from the SDNCs. The SDNCs may also modify the behavior of an SDN network dynamically to adapt to changes in the network (e.g. infrastructure changes, new applications and/or services deployment, and/or business requirement changes). When multiple SDN domains are interconnected, SDNCs from different SDN domains may interwork together (e.g. to perform inter-domain routing across the different SDN domains). In addition to traditional networking information, SDN specific topology information may be employed for SDN inter-domain routing. Inter-domain SDN specific topology information may be collected and input to each SDNC manually. However, manual configuration of SDN specific topology information may not support automatic network discovery in an SDN interconnection network and may not adapt to network changes dynamically.

Disclosed herein are methods, apparatuses, and/or computer program products for discovering SDN specific topology information across a plurality of interconnected SDN domains. SDN specific topology information may include SDN IDs, SDN member router ID lists, and SDNC address lists. A centralized management entity, such as an SDNC or a group of SDNCs (SDNCG), may determine SDN specific topology information for inter-domain advertisement, instruct border routers to broadcast the SDN specific topology information, receive SDN specific topology information from other SDN domains, and compute routes through the SDN domains. The SDNCs may determine to advertise only border routers and/or links, a selected group of routers and/or links, or all internal routers and/or links to other interconnected SDN domains. The SDNCs may determine to advertise partial or all SDNCs to other interconnected SDN domains. The SDNCs may perform node base routing or SDN-domain base routing. In node base routing, a SDNC may advertise all routers and links in a SDN domain that the SDNC manages to other SDN domains and SDNCs of the other SDN domains may then compute a best path through each node and link of the advertised SDN domain. In SDN-domain base routing, a SDNC may advertise border routers and links of a SDN domain that the SDNC manages to other SDN domains and SDNCs of the other SDN domains may compute a best path across the advertised SDN domain, for example, by treating the advertised SDN domain as a single virtual node when applying the shortest path first (SPF) algorithm in the IS-IS and/or OSPF protocols. The communication of SDN specific topology information may leverage various available routing protocols, such as the Interior Gateway Protocol (IGP), Link Layer Discovery Protocol (LLDP), or any other neighbor discovery protocol. In some example embodiments, SDN specific topology information may be communicated by extending the IS-IS protocol, the OSPF v2 protocol, or the OSPF v3 protocol, as described in Internet Engineering Task Force (IETF) documents Request for Comment (RFC) 1142, RFC 2328, or RFC 5340, respectively, which are incorporated herein by reference as if reproduced in their entirety.

FIG. 1 is a schematic diagram of an example embodiment of an SDN interconnection network 100. Network 100 may comprise a plurality of SDN domains A, B, and C 110. One or more connections 130 may interconnect SDN domains 110 in network 100, where connections 130 may be referred to as inter-domain connections. Each SDN domain 110 may be a single SDN domain. Each SDN domain 110 may comprise an SDNC 120 or an SDNCG and a plurality of interconnected network devices 140. Connections 130 and/or other links shown in FIG. 1 may include physical connections, such as fiber optic links, electrical links, wireless links, and/or logic connections. Connection 130 may comprise a single link, a series of parallel links, a plurality of interconnected nodes, and/or various combinations thereof used to transport data between SDN domains 110.

The SDNC 120 may be any device configured to control and manage an SDN domain 110. Each SDNC 120 may be located within an SDN domain 110 physically and/or logically. For example, SDNC A 120 may be configured to manage and control SDN domain A 110, SDNC B 120 may be configured to manage and control SDN domain B 110, and SDNC C 120 may be configured to manage and control SDN domain C 110. SDNCs 120 may perform a variety of control plane functions that may include, but are not limited to, generating and obtaining routing information, network topology, and/or network state information. For example, SDNC A 120 may generate and advertise SDN specific topology information of SDN domain A 110, SDNC B 120 may generate and advertise SDN specific topology information of SDN domain B 110, and SDNC C 120 may generate and advertise SDN specific topology information of SDN domain C 110. Accordingly, SDNC A 120 may receive SDN specific topology information of SDN domains B and C 110, SDNC B 120 may receive SDN specific topology information of SDN domains A and C 110, and SDNC C 120 may receive SDN specific topology information of SDN domains A and B 110, respectively. Upon receiving SDN specific topology information of other interconnected SDN domains 110, each SDNC 120 may construct a global topology map, compute best paths or routes for packet delivery from one node to another node, and generate route and/or flow tables comprising optimized paths. Each SDNC 120 may configure network devices 140 in an SDN domain 110 that the SDNC 120 manages, for example, by transmitting flow tables to the network devices 140. Each SDNC 120 may communicate with a network device 140 over a controller-device interface 150 (e.g. represented as dashed lines), which may employ any standardized protocol (e.g. the OpenFlow protocol). It should be noted that prior to advertising SDN specific topology information, each SDNC 120 may advertise traditional link state information which has been defined in IGP.

The network devices 140 may be any physical device (e.g. router or switch) or logical device configured to perform data forwarding functions according to the SDN routes specified by SDNCs 120 in an SDN domain 110. The network devices 140 may not perform control plane functions (e.g. determine routes). Network devices 140 may route data flows based on flow tables received from SDNC 120.

The SDN domains 110 may employ any IGP (e.g. link state routing protocol) to gather and/or collect inter-domain network topology information in network 100. In an example embodiment, SDN domains 110 may employ the IS-IS protocol for routing data traffic through network 100. The IS-IS protocol may be designed to operate in an Open System Interconnection (OSI) network layer (e.g. OSI Layer 3), and thus may perform routing with any network address (e.g. IPv4 and/or IPv6 addresses). In another example embodiment, SDN domains 110 may employ the OSPF v2 or OSPF v3 protocol to route data traffic in network 100. The OSPF v2 protocol may be designed to operate in layer 3 and route IPv4 data traffic, whereas the OSPF v3 protocol may be extended to route IPv6 data traffic.

In some example embodiments, each domain 110 in network 100 may run the same or different routing protocols for intra-domain routing (e.g. within an SDN domain 110), or may not run any intra-domain routing protocol (e.g. manually configure all network devices by a SDNC). In addition, an SDN domain 110 may run one routing protocol for intra-domain routing and another routing protocol externally for inter-domain routing (e.g. across SDN domains 110). For example, SDN domains A and B 110 may run the IS-IS protocol for intra-domain routing, SDN domain C 110 may be run the OSPF v2 protocol for intra-domain routing, and the SDN domains A, B, and C 110 may run the OSPF v2 protocol for inter-domain routing.

Figure 2:
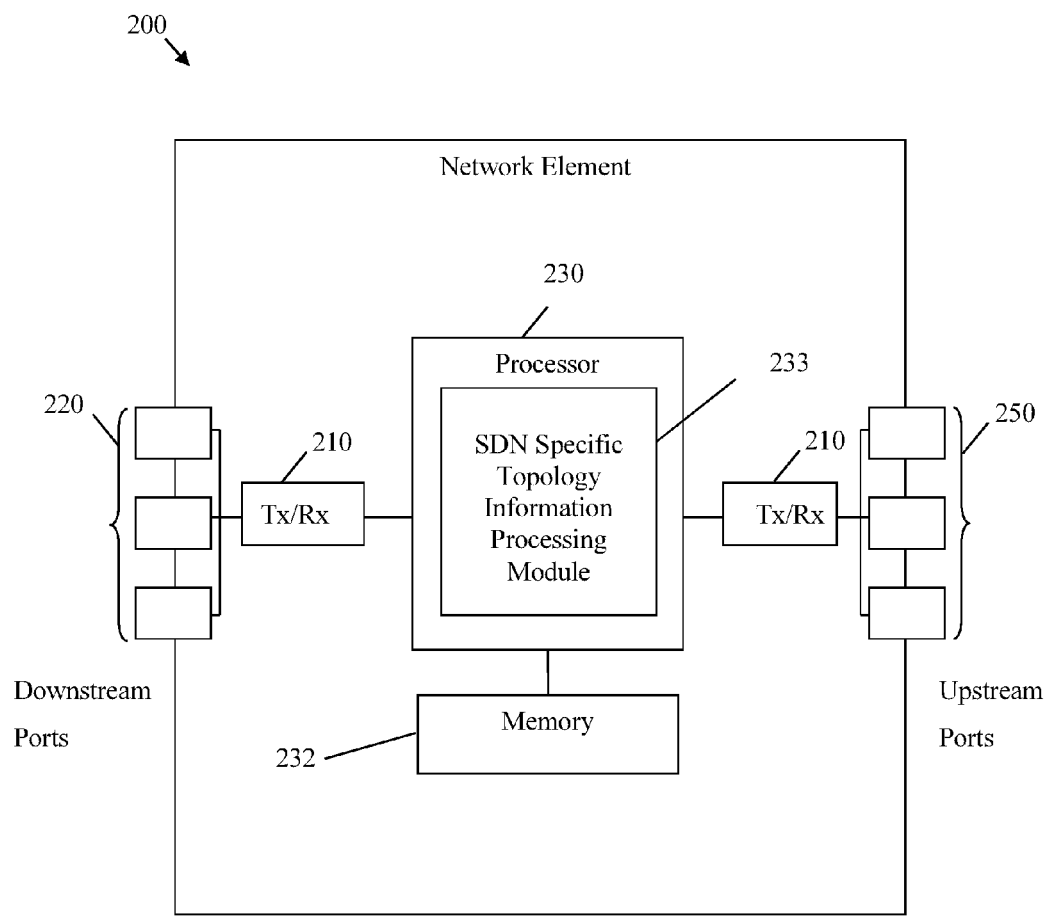
FIG. 2 is a schematic diagram of an example embodiment of a network element (NE).

FIG. 2 is a schematic diagram of an example embodiment of an NE 200, which may act as an SDNC (e.g. SDNC 120) or a network device (e.g. network device 140), in an SDN domain (e.g. SDN domain 110). NE 200 may be configured to determine routes and/or links in an SDN domain that may be visible to other interconnected SDN domains, generate SDN specific topology information, and/or advertise the SDN specific topology information to the interconnected SDN domains. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 200. For instance, the features/methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of downstream ports 220 for transmitting and/or receiving frames from other nodes and a Tx/Rx 210 may be coupled to plurality of upstream ports 250 for transmitting and/or receiving frames from other nodes, respectively. A processor 230 may be coupled to the Tx/Rx 210 to process the frames and/or determine which nodes to send the frames to. The processor 230 may comprise one or more multi-core processors and/or memory devices 232, which may function as data stores, buffers, etc. Processor 230 may be implemented as a general processor or may be part of one or more application specific integrated circuits (ASICs) and/or digital signal processors (DSPs). Processor 230 may comprise an SDN specific topology information processing module 233, which may implement an SDN specific topology information generation method 300 and/or an SDN specific topology information exchange method 400 as discussed more fully below. In an alternative embodiment, the SDN specific topology information processing module 233 may be implemented as instructions stored in the memory devices 232, which may be executed by processor 230. The memory device 232 may comprise a cache for temporarily storing content, e.g., a Random Access Memory (RAM). Additionally, the memory device 232 may comprise a long-term storage for storing content relatively longer, e.g., a Read Only Memory (ROM). For instance, the cache and the long-term storage may include dynamic random access memories (DRAMs), solid-state drives (SSDs), hard disks, or combinations thereof.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

When multiple SDN domains (e.g. SDN domains 110) are interconnected in an SDN interconnection network (e.g. network 100), IGP flooding may be employed to exchange SDN specific topology information between the interconnected SDN domains. For example, a first SDNC (e.g. SDNC 120) may generate a link state message comprising SDN specific topology information of an SDN domain that the SDNC manages and flood the message over each interconnected SDN domains. Thereafter, a second SDNC (e.g. SDNC 120) may receive the flooded link state message and update route tables based on the routing information received in the flooded link state message. Next, the second SDNC may flood the link state message over each interconnected SDN domain except for the SDN domain where the link state message was received. The flooding process may be repeated at each SDN domain until each interconnected SDN domain has received the link state message. Each SDNC may flood the topology information directly to the other SDNCs. Alternatively, the SDNCs may cause associated network devices 140 to flood the topology information between domains to other network devices 140 for transmission to associated SDNCs. In order to differentiate the broadcasted network topology information from one SDN domain to another SDN domain, an SDN ID may be introduced to uniquely identify an SDN domain in an SDN administrative area. In addition to the SDN ID, an SDN member router ID list and SDNC address list may be introduced to identify the routers and SDNCs that belong to an SDN domain, respectively. Each SDNC may have multiple addresses and may comprise IPv4 addresses and/or IPv6 addresses. In an example embodiment, the SDN ID, SDN member router ID list, and SDNC address list may be communicated by extending the IS-IS protocol, the OSPF v2 protocol, and/or the OSPF v3 protocol. For example, the IS-IS protocol, the OSPFv2 protocol, and/or the OSPFv3 protocol may be extended to carry SDN specific topology information in an IS-IS LSP, an OSPFv2 opaque LSA, and/or an OSPFv3 LSA, respectively, which may be discussed more fully below.

Figure 3:
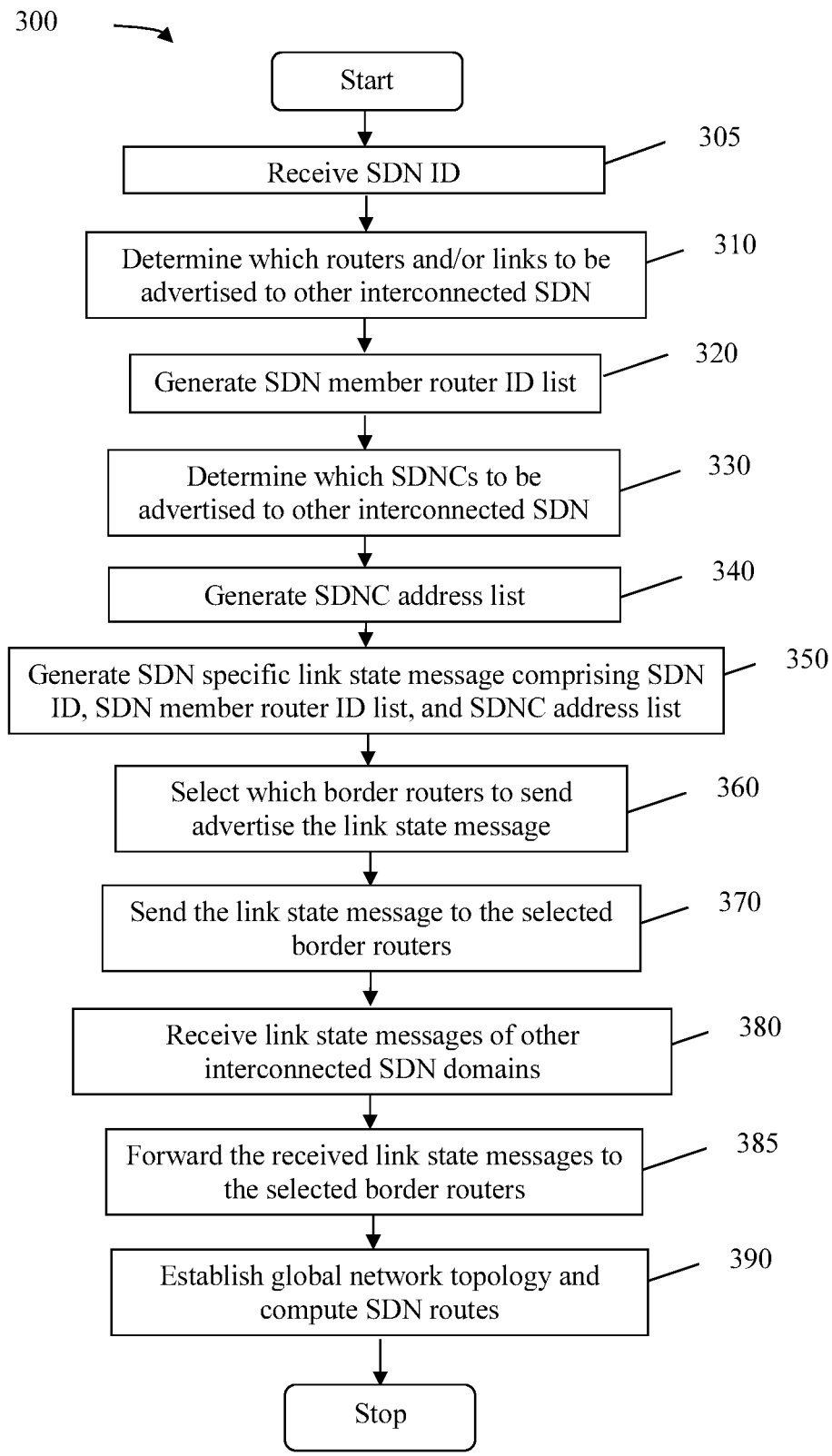
FIG. 3 is a flowchart of an example embodiment of a method for generating SDN specific topology information in an SDN interconnection network.

FIG. 3 is a flowchart of an example embodiment of a method 300 for generating SDN specific topology information in an SDN interconnection network (e.g. network 100), which may be implemented in an SDNC (e.g. SDNC 120) and/or an NE (e.g. NE 200) that provides SDNC functionalities. The method 300 may begin when an SDN domain (e.g. SDN domain 110) is started and/or when the device providing the SDNC functionalities is powered up. At step 305, method 300 may receive an SDN ID from a network administrator of the SDN interconnection network, where the SDN ID may be a unique ID in the SDN interconnection network. At step 310, method 300 may determine routers and/or links in an SDN domain that may be advertised externally to other interconnected SDN domains. It should be noted that some routers and/or links may be hidden from other SDN domain in the SDN interconnection network. At step 320, method 300 may generate an SDN member router ID list comprising IDs of the routers determined in step 310. At step 330, method 300 may determine SDNCs in the SDN domain that may be advertised externally to the interconnected SDN domains. At step 340, method 300 may generate an SDNC address list comprising addresses of the SDNCs determined in step 330. At step 350, method 300 may generate a link state message comprising an SDN ID identifying the SDN domain, the SDN member router ID list generated in step 320, and the SDNC address list generated in step 340. At step 360, method 300 may select border routers (e.g. from the routers determined in step 310 that are positioned at the border of the SDN domain) to send the link state message to the interconnected SDN domains. At step 370, method 300 may send the link state message to the border routers selected in step 360 and the border routers may then flood the link state message to other inter-connected routers that belong to other SDN domains. At step 380, method 300 may receive link state messages comprising SDN specific topology information of the interconnected SDN domains. At step 385, method 300 may forward the received link state messages to the border routers selected at step 360 and the border routers may then flood the link state messages to other inter-connected routers that belong to other SDN domains except the SDN domain that the link state messages were received. At step 390, method 300 may establish a global network topology and compute SDN routes by employing algorithms such as the SPF algorithm or constrained shortest path first (CSPF) algorithm. It should be noted that link state messages (e.g. as defined in IGP) comprising the selected routers and/or links may be advertised prior to advertising SDN specific topology information.

It should be noted that the link state message generated in step 350 may be dependent on the operating routing protocol. In an example embodiment, the link state message may be a IS-IS protocol LSP comprising an SDN ID, an SDN member router ID list, an SDNC IPv4 address list, and/or an SDNC IPv6 address list. In another example embodiment, the link state message may be an OSPF LSA (e.g. OSPF v2 opaque LSA or OSPFv3 protocol LSA). The OSPF LSA may comprise an SDN ID, an SDN member router ID list, an SDNC IPv4 address list, and/or an SDNC IPv6 address list.

Figure 4:
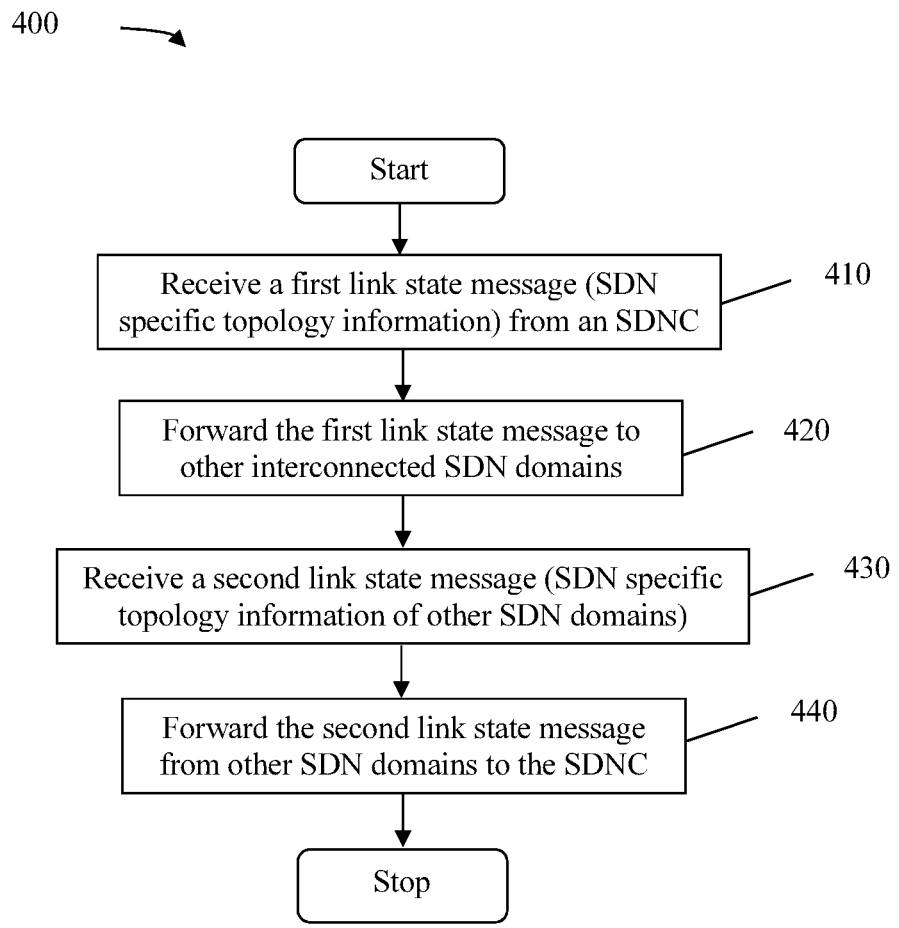
FIG. 4 is a flowchart of an example embodiment of a method for exchanging SDN specific topology information in an SDN interconnection network.

FIG. 4 is a flowchart of an example embodiment of a method 400 for exchanging SDN specific topology information in an SDN interconnection network, which may be implemented on a network device (e.g. network device 140) that is a border router in an SDN domain (e.g. SDN domain 110), or an NE (e.g. NE 200). The method 400 may begin with receiving a first link state message comprising SDN specific topology information from an SDNC (e.g. SDNC 120) via a controller-device interface (e.g. interface 150) at step 410. At step 420, method 400 may forward the first link state message to other interconnected SDN domains. At step 430, method 400 may receive a second link state message comprising SDN specific topology information of the other interconnected SDN domains via an inter-domain connection (e.g. connection 130). At step 440, method 400 may forward the second link state messages to the SDNC. As discussed above, the first and second link state messages may be routing protocol dependent.

Figure 5:
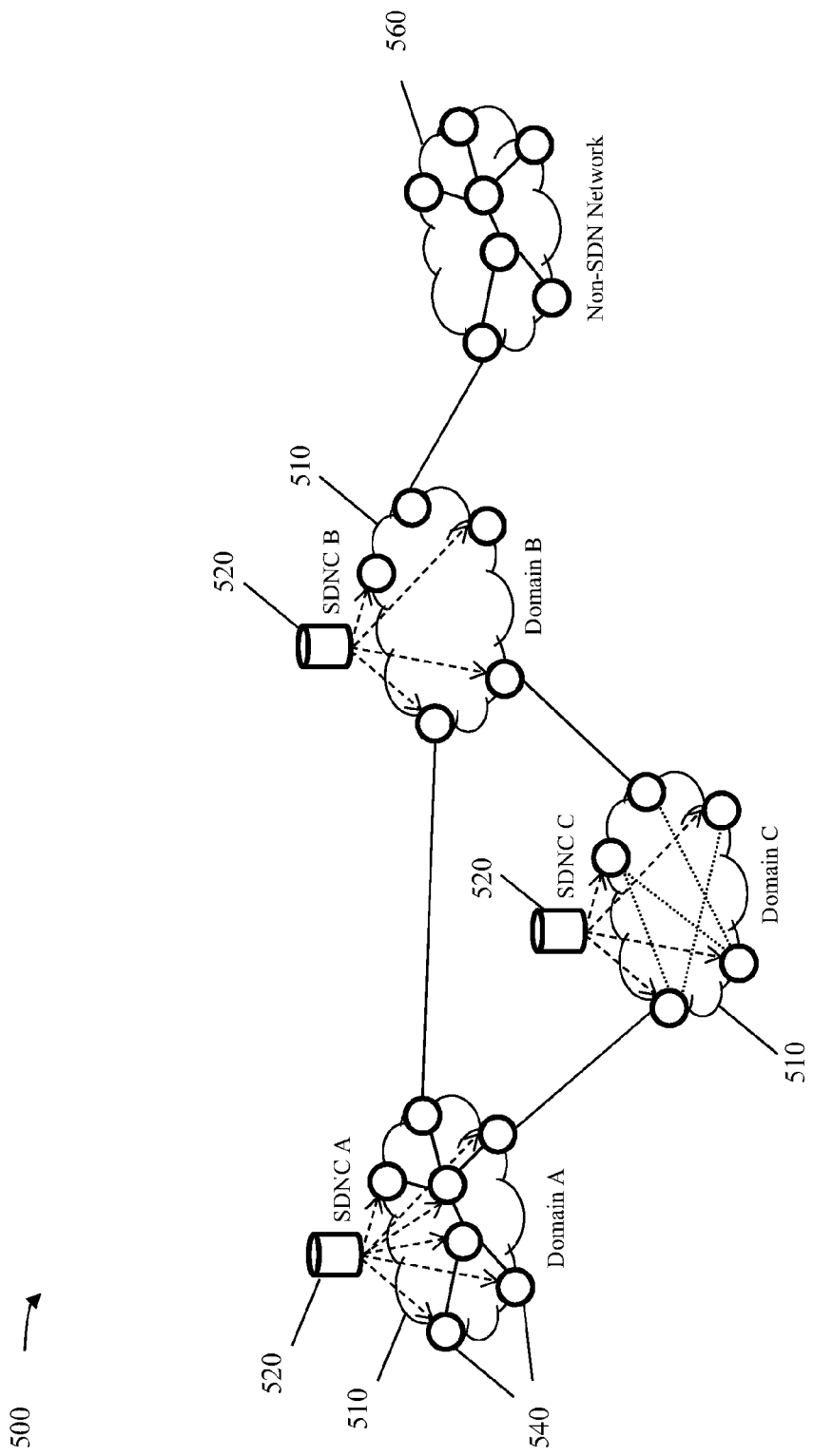
FIG. 5 is a schematic diagram of another example embodiment of an SDN interconnection network that illustrates a use case scenario.

FIG. 5 is a schematic diagram of another example embodiment of an SDN interconnection network 500 that illustrates a use case scenario. Network 500 may be substantially similar to network 100, but may further comprise a non-SDN networking domain 560 interconnected with SDN domains B and C 510. In network 500, inter-domain routing may employ the IS-IS protocol, OSPF v2 protocol, and/or the OSPF v3 protocol. In an example embodiment for inter-domain routing, SDNC A 520 may advertise all or partial routers 540 and/or links in SDN domain A 510, SDNC B 520 may advertise only border routers and hide all internal routers and/or links in SDN domain B 510, and SDNC C 520 may advertise border routers and some selected internal router and/or links in SDN domain C 510, where the links may be physical links or logical links (e.g. represented as dotted lines between network devices 540 in FIG. 5).

Figure 6:
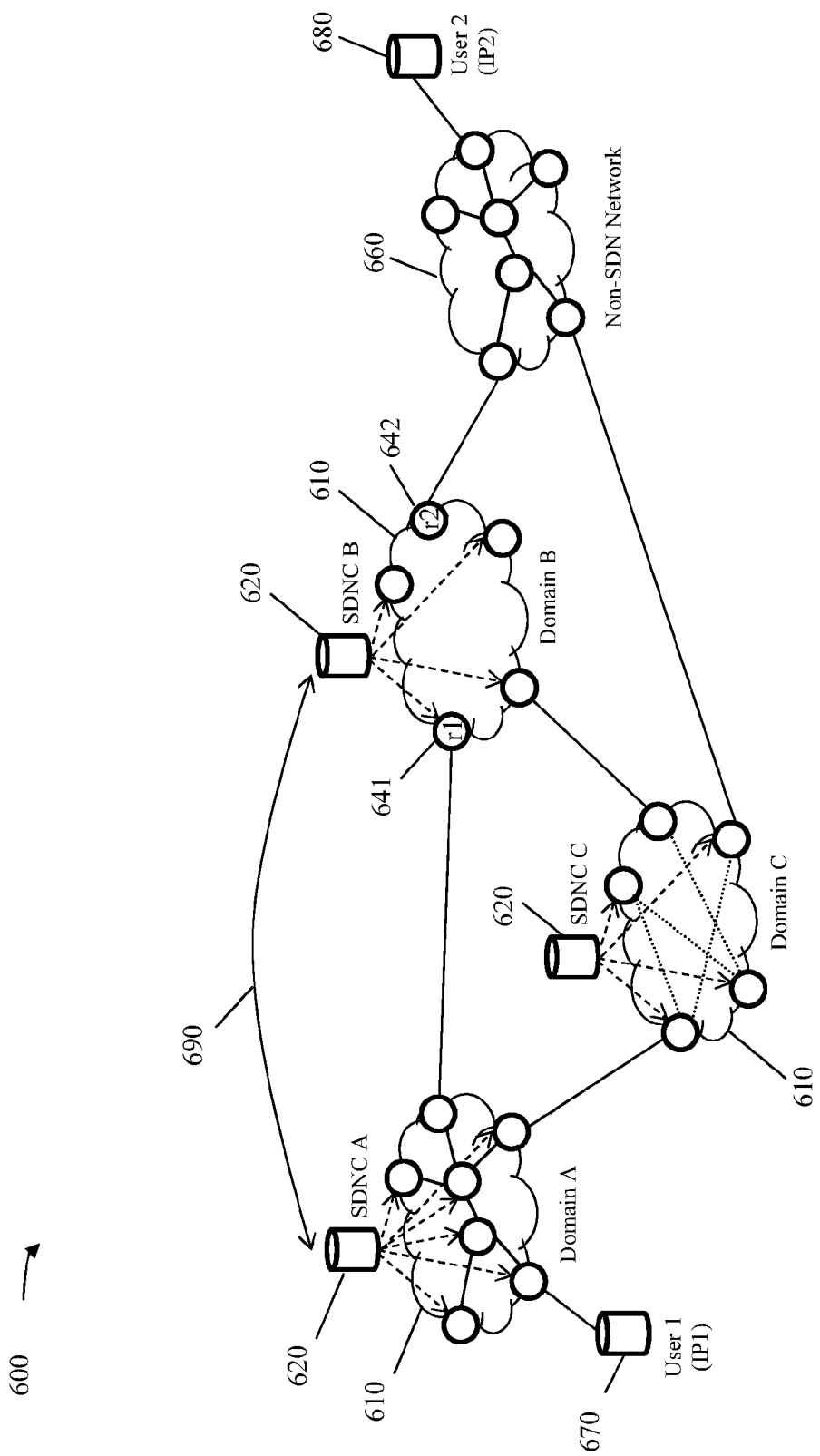
FIG. 6 is a schematic diagram of another example embodiment of an SDN interconnection network that illustrates a path set up scenario.

FIG. 6 is a schematic diagram of another example embodiment of an SDN interconnection network 600 that illustrates a path setup scenario. Network 600 may be substantially similar to network 500, but may further comprise an internet user 1 with IP address 1 (IP1) 670 connecting to an SDN domain A 610 and an internet user 2 with IP address (IP2) 680 connecting to a non-SDN networking domain 660. Network 600 may illustrate topology from SDNC A 610's point of view. In an example embodiment, SDN domain A 610 may be requested to send a packet from IP1 670 to IP2 680. SDNC A 620 may employ a node base routing method or a SDN-domain base routing method. When SDNC A 620 employs a node base routing, SDNC A 620 may select a path via SDN domain C 610 to reach IP2 680 since links between border routers in SDN domain C 610 may be known. Alternatively, SDNC A 620 may determine to perform SDN-domain base routing via SDN domain B 610 instead of node base routing since SDN domain B 610 comprises hidden internal routes. For example, after receiving SDN specific topology information of another SDN domain, a SDNC may group all nodes and/or links belonging to a SDN domain, and then all nodes and/or routers in an SDN domain may be abstracted as one vertex and all external links in an SDN domain may be abstracted as edges connecting to the abstracted vertex, where vertex and edges may be employed in a SPF (e.g. Dijkstra algorithm) calculation to represent node and links, respectively. In this case, SDNC A 620 may treat SDN domain B 610 as a single routing entity based on link information received from SDN domain B 610 (e.g. SDN domain B 610 may reach IP2 680 via non-SDN network 660) and determine to reach IP2 680 via SDN domain B 610. Since SDNC B 620 may have hidden internal routes, SDNC A 620 may request SDNC B 620 to establish a path between two advertised border routers in SDN domain B 610 (e.g. advertised router r1 641 and router r2 642) to reach IP2 680. The request may be transported over an SDNC interface (SDNCi) 690, where SDNCs 620 from different SDN domains 610 may communicate (e.g. request for network provisioning, services, status reports, paths removal, addition, or modification, etc.).

Figure 7:
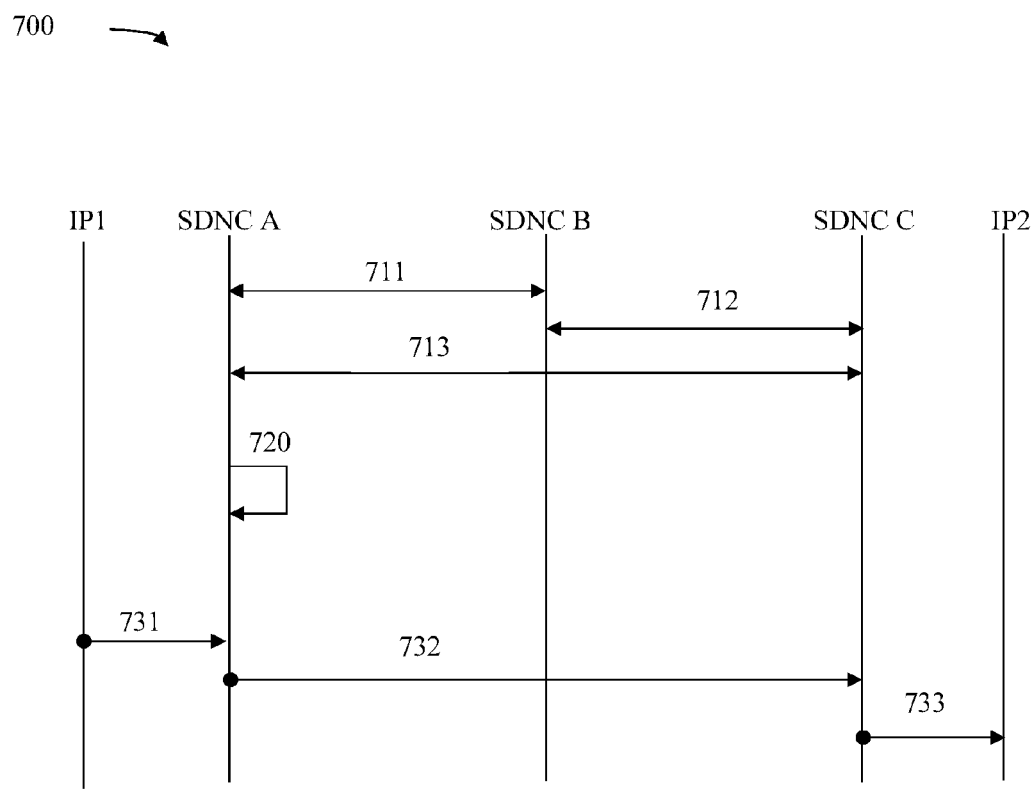
FIG. 7 is a protocol diagram of an example embodiment of a method for setting up paths in the SDN interconnection network of FIG. 6.

FIG. 7 is a protocol diagram of an example embodiment of a method 700 for setting up a path in SDN interconnection network 600, which may be implemented between an IP1 (e.g. IP1 670), an SDNC A (e.g. SDNC A 620), an SDNC B (e.g. SDNC B 620), an SDNC C (e.g. SDNC C 620), and an IP2 (e.g. IP2 680). It should be noted that the non-SDN network 660 of network 600 may not be shown in method 700 for simplicity. For example, SDNC A may set up a path between IP1 and IP2 for packet delivery. Method 700 may begin with SDNC A, SDNC B, and SDNC C exchanging link state messages comprising SDN specific topology information, where each SDNC A, B, or C may generate and advertise SDN specific topology information that the SDNC manages and receive SDN specific topology information of other interconnected SDN domains A, B, and/or C. For example, SDNC A and SDNC B may exchange link state messages at step 711, SDNC B and SDNC C may exchange link state messages at step 712, SDNC A and SDNC C may exchange link state messages at step 713. At step 720, SDNC A may compute paths (e.g. employing the SPF or CSPF algorithm) based on the received SDN specific topology information of SDN domain B and C to obtain a tree sourced from SDN domain A. For example, SDNC A may determine to perform node base routing. In this case, SDNC A may select a path via SDN domain C based on the received SDN specific topology information (e.g. links between border routers in SDN domain C). At step 731, SDNC A may receive a packet from IP1, where the packet's destination may be IP2. At step 732, SDNC A may route the packet to SDN domain C. At step 733, SDNC C may route the packet to IP2.

Figure 8:
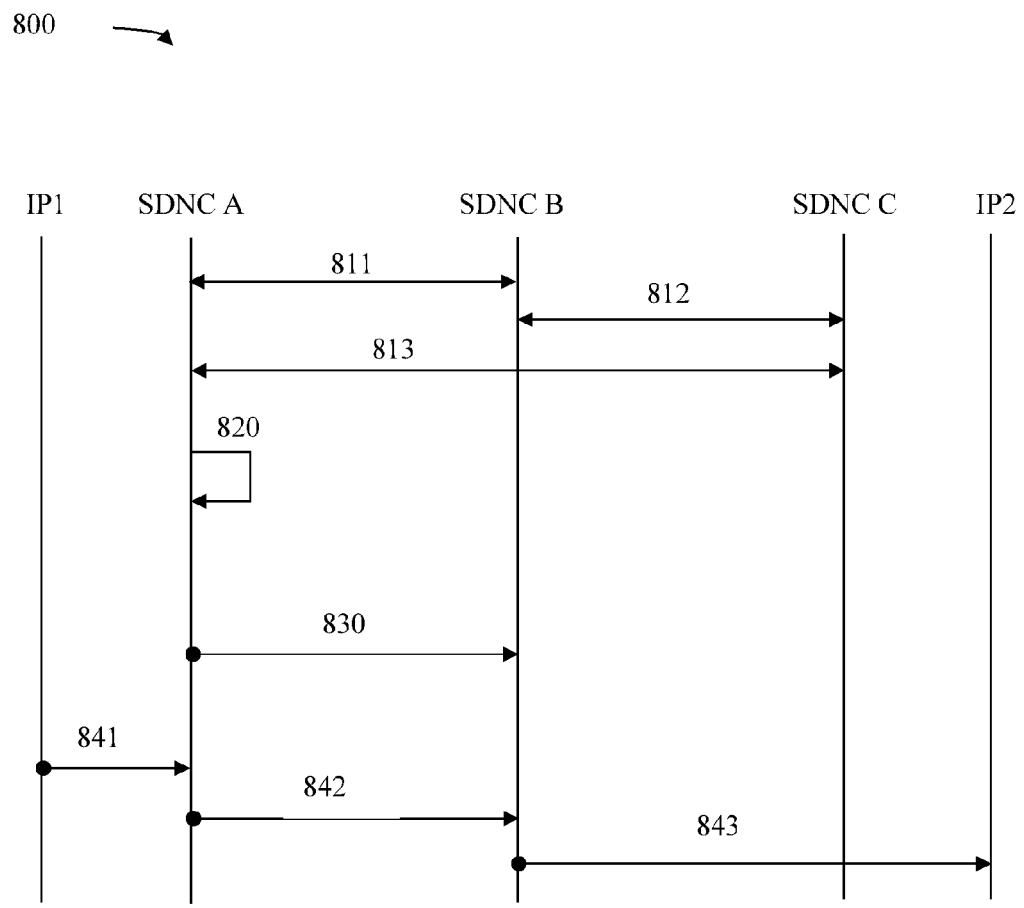
FIG. 8 is a protocol diagram of another example embodiment of a method for setting up paths across the SDN interconnection network of FIG. 6.

FIG. 8 is a protocol diagram of another example embodiment of a method 800 for setting up a path in SDN interconnection network 600, which may be implemented between an IP1 (e.g. IP1 670), an SDNC A (e.g. SDNC A 620), an SDNC B (e.g. SDNC B 620), an SDNC C (e.g. SDNC C 620), and an IP2 (e.g. IP2 680). It should be noted that the non-SDN network 660 of network 600 may not be shown in method 800 for simplicity. For example, SDNC A may set up a path between IP1 and IP2 for packet delivery. At step 811, SDNC A and SDNC B may exchange SDN specific topology information. At step 812, SDNC B and SDNC C may exchange SDN specific topology information. At step 813, SDNC A and SDNC C may exchange SDN specific topology information. Steps 811, 812, and 813 may be substantially similar to steps 711, 712, and 713 of method 700. At step 820, SDNC A may compute paths, which may be substantially similar to step 720 of method 700, but method 800 may perform a SDN-domain base routing instead of node base routing as in method 700. As such, SDNC A may select a path to reach IP2 via SDN domain B instead of SDN domain C. At step 830, SDNC A may request SDNC B via an SDNCi (e.g. via SDNCi 690) to establish a path between the border routers (e.g. routers r1 and r2) in SDN domain B to reach IP2 since SDN domain B may have hidden internal links between border routers. At step 841, SDNC A may receive a packet from IP1, where the packet's destination may be IP2. At step 842, SDNC A may route the packet to SDN domain B. At step 843, SDNC B may route the packet to IP2.

In an example embodiment, the IS-IS protocol, the OSPF v2 protocol, and/or the OSPFv3 protocol may be extended to carry SDN specific topology information by embedding TLV-encoded SDNC specific topology information in an IS-IS LSP, an OSPFv2 opaque LSA, and/or an OSPFv3 LSA, respectively. A TLV encoded message may include a type field that may indicate the message type, followed by a length field that may indicate the size of the message value, and a variable-sized series of octets that carry the data for the message. The IS-IS protocol extension and the OSPF protocols extensions may be described in more details in the following two example embodiments.

Figure 9:
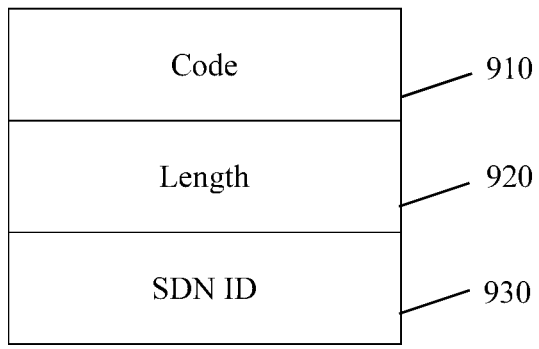
FIG. 9 is a schematic diagram of an example embodiment of an SDN ID type-length-value (TLV) for an IS-IS LSP.

In a first example embodiment, the IS-IS protocol may be extended to carry SDN specific topology information. In the IS-IS protocol, routing information between IS-IS nodes may be carried in IS-IS LSPs for distribution. Each IS-IS LSP may comprise a IS-IS header and a TLV encoded data. FIGS. 9-12 may illustrate example embodiments of SDN specific topology information TLVs for IS-IS LSPs. FIG. 9 is a schematic diagram of an example embodiment of an SDN ID TLV 900 for an IS-IS LSP. The SDN ID TLV 900 may comprise a code field 910, a length field 920, and an SDN ID field 930. The code field 910 may be about one octet long and may indicate TLV 900 is an SDN ID TLV. For example, the code field 910 be about one octet long and may be set to a value of 134. The length field 920 may be about one octet long and may indicate the length of the SDN ID field 930. The length of the SDN ID field 930 may be about four octets (e.g. IPv4 address), about six octets (e.g. Media Access Control (MAC) address), or about sixteen octets (e.g. IPv6 address). The value in the SDN ID field 930 may indicate the identity of an SDN domain, which may be assigned by Internet Assigned Numbers Authority (IANA) or defined by agreements between different SDN administrations. Each SDN ID may be a unique ID within an interconnected network where IGP is operating.

Figure 10:
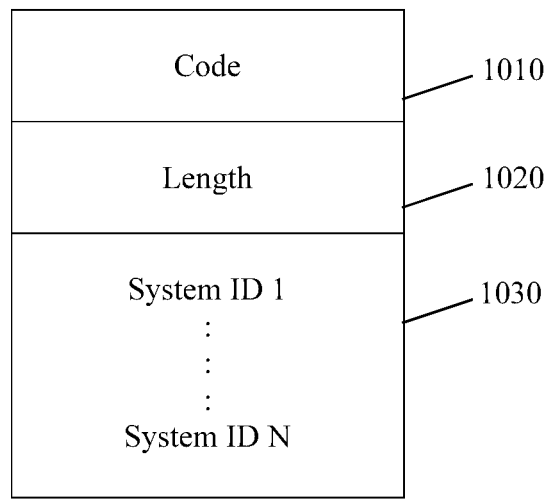
FIG. 10 is a schematic diagram of an example embodiment of an SDN member router ID TLV for an IS-IS LSP.

FIG. 10 is a schematic diagram of an example embodiment of an SDN member router ID list TLV 1000 for an IS-IS LSP. The SDN member router ID list TLV 1000 may comprise a code field 1010 and a length field 1020, which may be substantially similar to code field 910 and length field 920, respectively. However, the code field 1010 may be set to a value to indicate TLV 1000 is an SDN member router ID list TLV (e.g. a value of 135) and the length field 1020 may be set to a value to indicate the length of a variable length of system ID list field 1030. The system ID list field 1030 may comprise a plurality of system IDs as defined in the IS-IS protocol for routers ID, where each system ID may be about six octets long. The system IDs may indicate the identity of a router that belongs to an SDN domain. It should be noted that each router may be associated with only one SDN domain.

Figure 11:
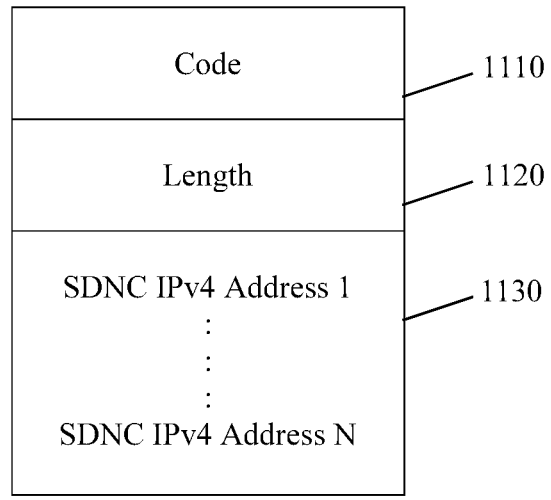
FIG. 11 is a schematic diagram of an example embodiment of an SDN Internet Protocol version 4 (IPv4) address list TLV for an IS-IS LSP.

FIG. 11 is a schematic diagram of an example embodiment of an SDNC IPv4 address list TLV 1100 for an IS-IS LSP. The SDNC IPv4 address list TLV 1100 may comprise a code field 1110 and a length field 1120, which may be similar to code field 910 and length field 920, respectively. However, the code field 1110 may be set to a value to indicate TLV 1100 is an SDNC IPv4 address list TLV (e.g. a value of 136) and the length field 1120 may be set to a value to indicate the length of a variable length of SDNC IPv4 address list field 1130. The SDNC IPv4 address list field 1130 may comprise a plurality of SDNC IPv4 addresses, where each SDNC IPv4 address may be about four octets long. The SDNC IPv4 addresses may indicate the SDNCs with IPv4 addresses in an SDN domain. The SDNCs may be accessed or reached through the SDNC IPv4 addresses.

Figure 12:
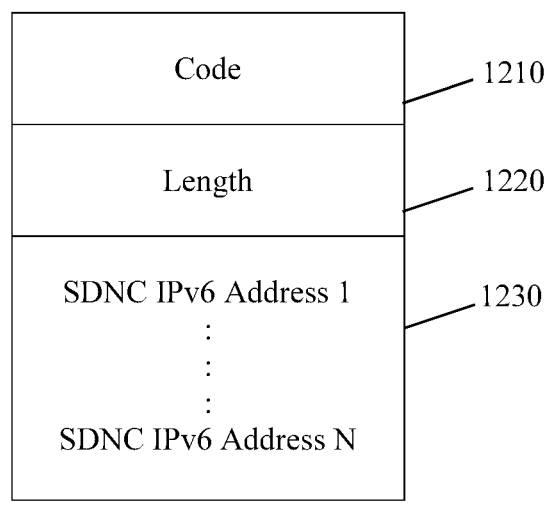
FIG. 12 is a schematic diagram of an example embodiment of an SDN Internet Protocol version 6 (IPv6) address list TLV for an IS-IS LSP.

FIG. 12 is a schematic diagram of an example embodiment of an SDN IPv6 address list TLV 1200 for an IS-IS LSP. The SDNC IPv6 address list TLV 1200 may comprise a code field 1210 and a length field 1220, which may be substantially similar to code field 910 and length field 920, respectively. However, the code field 1210 may be set to a value to indicate TLV 1200 is an SDNC IPv6 address list TLV (e.g. a value of 137) and the length field 1220 may be set to a value to indicate the length of a variable length of SDNC IPv6 address list field 1230. The SDNC IPv6 address list field 1230 may comprise a plurality of SDNC IPv6 addresses, where each SDNC IPv6 address may be about sixteen octets long. The SDNC IPv6 addresses may indicate the SDNCs with IPv6 addresses in an SDN domain. The SDNCs may be accessed or reached through the SDNC IPv6 addresses.

Figure 13:
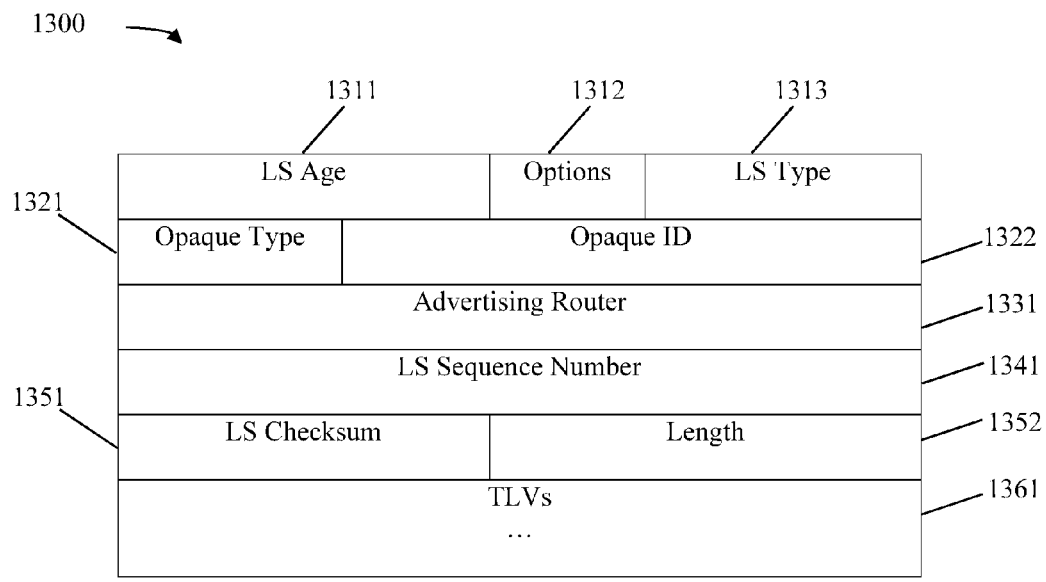
FIG. 13 is a schematic diagram of an example embodiment of an OSPF v2 opaque LSA.

In a second example embodiment, the OSPF v2 and OSPF v3 protocols may be extended to carry SDN specific topology information by introducing sub-TLVs to OSPF LSAs. FIGS. 13-17 may illustrate example embodiments of SDN specific topology information in an OSPF v2 opaque LSA for routing of IPv4 data traffic. It should be noted that a substantially similar extension may be applied to OSPF v3 new LSA for routing of IPv6 data traffic. FIG. 13 is a schematic diagram of an example embodiment of an OSPF v2 opaque LSA 1300 as defined in RFC 2328. The OSFP v2 opaque LSA 1300 may comprise a link state (LS) age field 1311, an options field 1312, a LSA type field 1313, an opaque type field 1321, an opaque ID field 1321, an advertising router field 1331, a LS sequence number field 1341, a LS checksum field 1351, a length field 1352, and TLVs 1361. The LS age field 1311 may be about two octets long and may indicate the time in seconds since the LSA 1300 was originated. The LS options field 1312 may be about one octet long and may indicate the optional capabilities supported by the routing domain. The LSA type field 1313 may be about one octet long and may indicate the format and function of LSA 1300. For example, the LSA type field 1313 may be set to a value of eleven, which may indicate flooding in autonomous system (AS) scoping. The opaque type field 1321 may be about one octet long and may indicate opaque type. For example, the opaque type field 1321 may be set to a value of seven or any other value assigned by the IANA, which may indicate that LSA 1300 is a SDN LSA. The field 1322 may be about three octets long and may indicate the opaque ID. For example, the opaque ID field 1322 may be set to a value of zero. The advertising router field 1331 may be about four octets long and may indicate the OSPF router ID of the LSA's 1300 originator. The LS sequence number field 1341 may be about four octets long and may be incremented by a router when a new LSA is being generated and may be employed to detect LSA duplications or old LSAs. The LS checksum field 1351 may be about two octets long and may indicate the checksum for the complete contents of LSA 1300. The length field 1352 may be about two octets long and may indicate the length of TLVs 1361. The TLVs 1361 may be variable in length and may comprise a plurality of sub-TLVs comprising SDN specific topology information, such as SDN ID, SDN member router ID list, SDNC IPv4 address list, and/or SNDC IPv6 address list.

Figure 14:
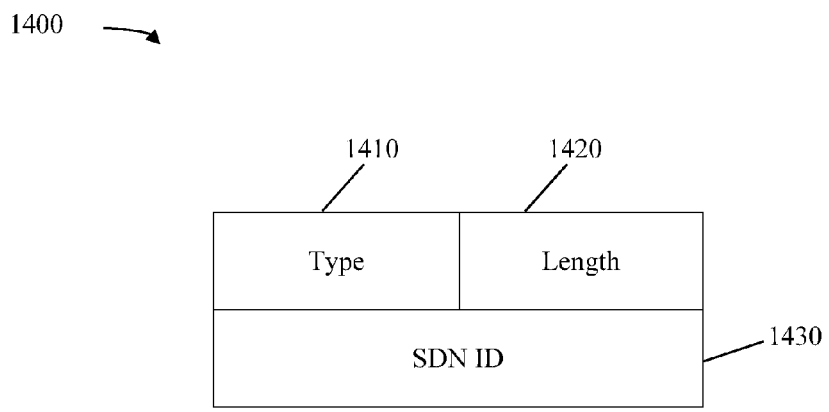
FIG. 14 is a schematic diagram of an example embodiment of an SDN ID sub-type-length-value (sub-TLV) for an OSPF v2 opaque LSA.

FIG. 14 is a schematic diagram of an example embodiment of an SDN ID sub-TLV 1400 for an OSPF v2 opaque LSA. The SDN ID sub-TLV 1400 may comprise a type field 1410 and a length field 1420, which may be substantially similar to code field 910 and length field 920, respectively. However, both the type field 1410 and the length field 1420 may be about two octets long and the type field 1410 may be set to a value of one or any other value assigned by the IANA to indicate that the sub-TLV 1400 is an SDN ID sub-TLV. The SDN ID sub-TLV 1400 may further comprise an SDN ID field 1430, which may be substantially similar to SDN ID field 930.

Figure 15:
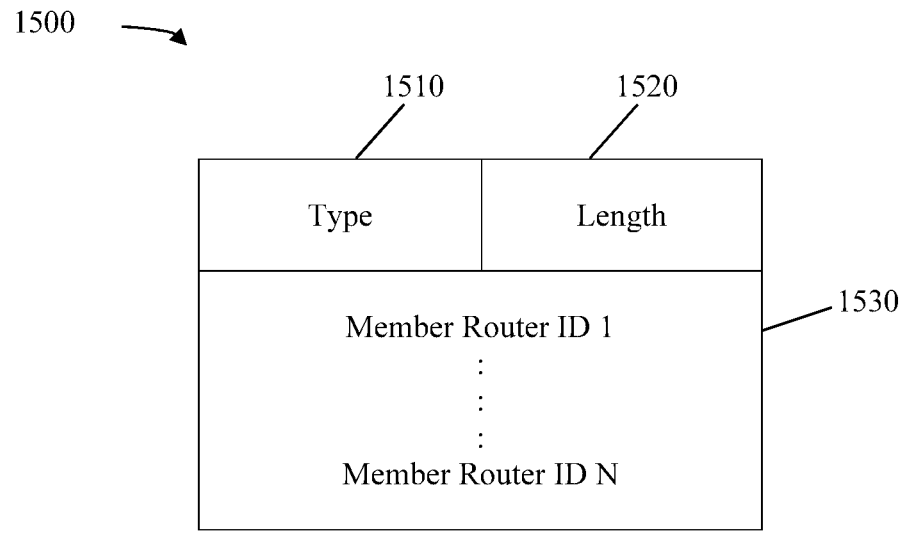
FIG. 15 is a schematic diagram of an example embodiment of an SDN member router ID sub-TLV for an OSPF v2 opaque LSA.

FIG. 15 is a schematic diagram of an example embodiment of an SDN member router ID list sub-TLV 1500 for an OSPF v2 opaque LSA. The SDN member router ID sub-TLV 1500 may comprise a type field 1510 and a length field 1520, which may be substantially similar to type field 1410 and length field 1420, respectively. However, the type field 1510 may be set to a value of two or any other values assigned by the IANA to indicate that the sub-TLV 1500 is an SDN member router ID list sub-TLV. The SDN member router ID list sub-TLV 1500 may further comprise a member router ID list field 1530 comprising a plurality of member router IDs, where each member router ID may be about four octets long. It should be noted that when a router advertises SDN member router ID list sub-TLV 1500, the SDN ID sub-TLV 1400 may be the first sub-TLV in TLVs field 1361.

Figure 16:
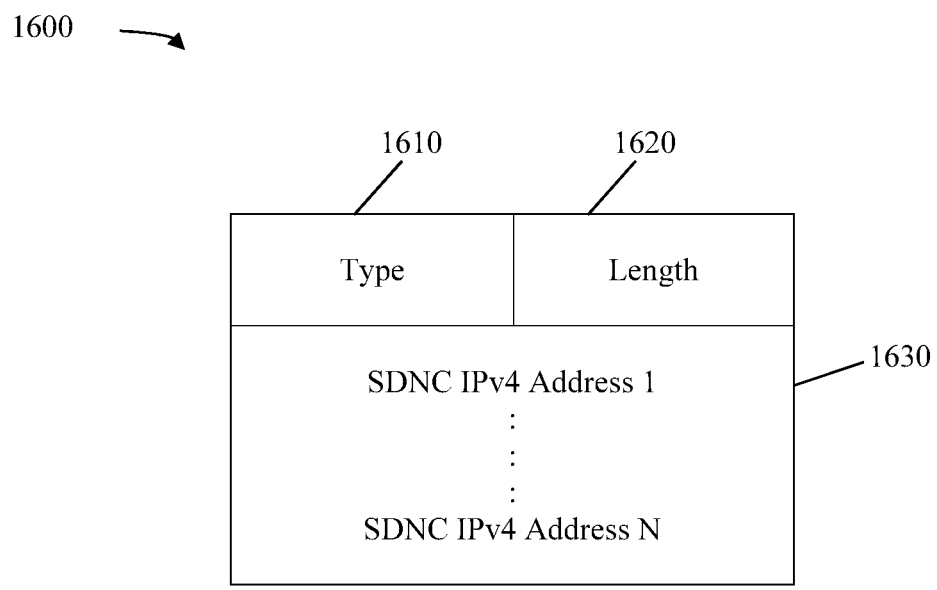
FIG. 16 is a schematic diagram of an example embodiment of an SDN IPv4 address list sub-TLV for an OSPF v2 opaque LSA.

FIG. 16 is a schematic diagram of an example embodiment of an SDNC IPv4 address list sub-TLV 1600 for an OSPF v2 opaque LSA. The SDNC IPv4 address list sub-TLV 1600 may comprise a type field 1610 and a length field 1620, which may be substantially similar to type field 1410 and length field 1420, respectively. However, the type field 1610 may be set to a value of three or any other values assigned by the IANA to indicate that the sub-TLV 1600 is an SDNC IPv4 address list sub-TLV. The SDNC IPv4 address list sub-TLV 1600 may further comprise an SDNC IPv4 address list field 1630, which may be substantially similar to SDNC IPv4 address list field 1130. It should be noted that when a router advertises SDNC IPv4 address list sub-TLV 1600, the SDN ID sub-TLV 1400 may be the first sub-TLV in TLVs field 1361.

Figure 17:
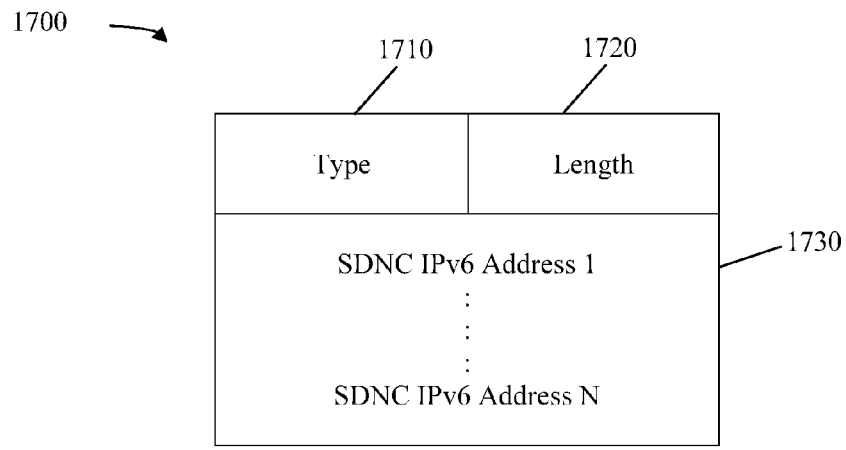
FIG. 17 is a schematic diagram of an example embodiment of an SDN IPv6 address list sub-TLV for an OSPF v2 opaque LSA.

FIG. 17 is a schematic diagram of an example embodiment of an SDNC IPv6 address list sub-TLV 1700 for an OSPF v2 opaque LSA. The SDNC IPv6 address list sub-TLV 1700 may comprise a type field 1710 and a length field 1720, which may be substantially similar to type field 1410 and length field 1420, respectively. However, the type field 1710 may be set to a value of four or any other values assigned by the IANA to indicate that the sub-TLV 1700 is an SDNC IPv6 address list sub-TLV. The SDNC IPv6 address list sub-TLV 1700 may further comprise an SDNC IPv6 address list field 1730, which may be substantially similar to SDNC IPv6 address list field 1230. It should be noted that when a router advertises SDNC IPv6 address list sub-TLV 1700, the SDN ID sub-TLV 1400 may be the first sub-TLV in TLVs field 1361.

Figure 18:
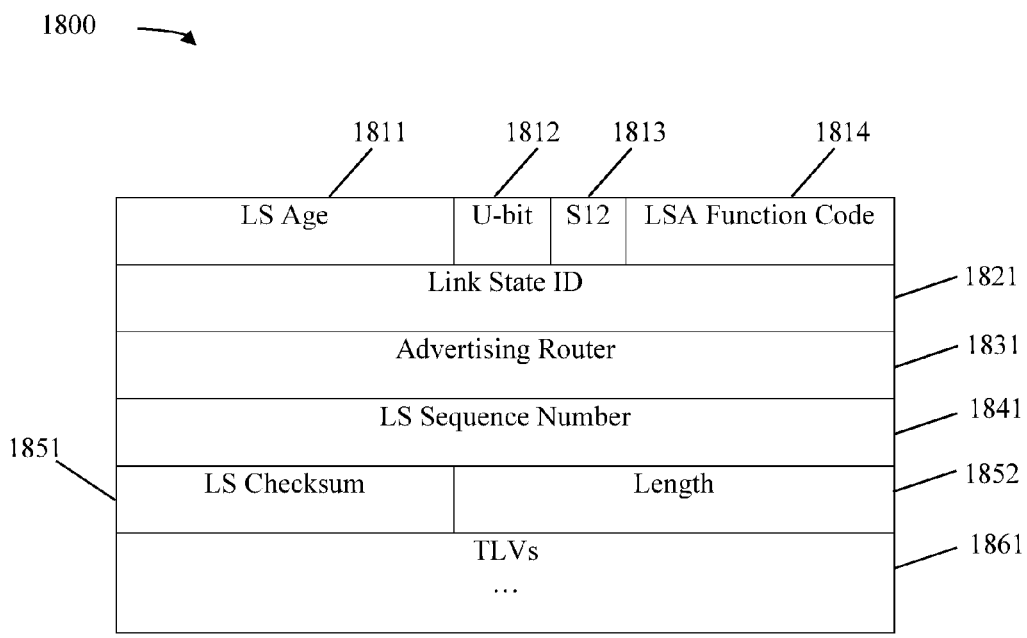
FIG. 18 is a schematic diagram of an example embodiment of an OSPF v3 new LSA.

FIG. 18 is a schematic diagram of an example embodiment of an OSPF v3 LSA 1800 as defined in RFC 5340. The OSFP v3 opaque LSA 1800 may be substantially similar to the OSPF v2 opaque LSA 1300, but may comprise a U-bit field 1812, an S12 field 1813, and a LSA function code field 1814 instead of options field 1312 and LS type field 1313. The U-bit field 1812, S12 field 1813, and LSA function code field 1814 may be referred to as LSA type. The LS age field 1811, advertising router field 1831, LS sequence number field 1841, LS checksum field 1851, and length field 1852 may be substantially similar to LS age field 1311, advertising router field 1331, LS sequence number field 1341, LS checksum field 1351, and length field 1352 for OSPF v2 opaque LSA 1300, respectively. The U-bit field 1812 may be about one bit long and may indicate LSA handling. For example, the U-bit field 1812 may be set to a value of one to indicate that a router that does not recognize the LSA's function code field 1814 and may store and flood the LSA 1800 as if the LSA type indicated by the fields 1812, 1813, and 1814 are understood. The S12 field 1813 may be about two bits long (e.g. S1 bit and S2 bit) and may indicate LSA flooding scope. For example, the S2 bit may be set to a value of one and the S1 bit may be set to a value of zero to indicate that flooding is in AS scope. The LSA function code field 1814 may be about thirteen bits long and may be set to a value of fifteen or any other values assigned by the IANA to indicate that the LSA 1800 is an SDN LSA. When the LSA function code field 1814 is set to fifteen, the LSA type value may be 0xC00F. In addition, the link state ID field 1821 may be set to zero. The SDN ID sub-TLV 1400, SDN member router ID list sub-TLV 1500, SDNC IPv4 address list sub-TLV 1600, and/or SDNC IPv6 address list sub-TLV 1700 may be populated in TLVs 1861 in a similar way as in TLVs 1361. It should be noted that both OSPF v2 opaque LSA 1300 and OSPF v3 LSA 1800 may include SDNC IPv4 address list sub-TLV 1600, as well as SDNC IPv6 address list sub-TLV 1700 since data plane and control plane may be decoupled in an SDN network. For example, the data plane may be forwarding IPv4 data traffic, while the SDNCs may employ IPv6 for control plane operations.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A computer program product for use by a software defined networking controller (SDNC) associated with a local software defined networking (SDN) domain in an SDN interconnection network, wherein the computer program product comprises computer executable instructions stored on a non-transitory computer readable medium such that when executed by a processor cause the SDNC to:
  determine a first set of network devices and links in the local SDN domain for link state advertisement to a remote SDN domain in the SDN interconnection network;
  determine local SDN specific topology information of the local SDN domain, wherein the local SDN specific topology information comprises a local SDN member router identifier (ID) list that associates the first set of network devices with the local SDN domain, a local SDN ID that identifies the local SDN domain and a local SDNC address list comprising an address of at least one local SDNC in the local SDN domain;
  determine a second set of network devices that are positioned at a border of the local SDN domain for communication with the remote SDN domain;
  receive a first message comprising remote SDN specific topology information of the remote SDN domain via an inter-domain connection and via at least one of the second network devices;
  direct a border network device included in the second set of network devices to advertise the local specific SDN topology information and link state advertisement to the remote SDN domain; and
  determine a route for packet delivery via the local SDN domain and the remote SDN domain based on the local SDN specific topology information and the remote SUN specific topology information.

2. The computer program product of claim 1, wherein the SDNC addresses are SDNC Internet Protocol (IP) addresses.

3. The computer program product of claim 1, wherein the first network devices comprise less than all network devices in the local SDN domain, and wherein the links comprise less than all links in the local SDN domain.

4. The computer program product of claim 1, wherein the second set of network devices are at least a subset of the first set of network devices.

5. The computer program product of claim 1, wherein the remote SDN specific topology information comprises data describing less than all network devices and links of the remote SDN domain, and wherein determining the route comprises configuring a policy on the first set of network devices to treat the remote SDN domain as a single vertex in a shortest path first (SPF) calculation and performing the SPF to generate a routing ee that extends between one of the network devices in the local SDN domain and all network devices in the SDN interconnection network.

6. The computer program product of claim 5, Wherein the instructions further cause the processor to send a routing request to a remote SDNC in the remote SDN domain over an SDNC interface (SDNCi) to establish another route through network devices and links that are not indicated in the remote SDN specific topology information.

7. A computer program product comprising computer executable instructions stored on a non-transitory computer readable medium such that when executed by a processor cause a network device to:
  receive a software defined networking (SDN) specific topology information of a local SDN domain over a controller-device interface, wherein the SDN specific topology information comprises an SDN identifier (ID) that identifies the local SDN domain, an SDN member router ID list comprising IDs of routers in the local SDN domain, and a software defined networking controller (SDNC) address list comprising at least one address of an SDNC in the local SDN domain; and
  advertise the SDN specific topology information to a remote SDN domain via an inter-domain connection.

8. The computer program product of claim 7, wherein the SDNC address list comprises at least one of Internet Protocol version 4 (IPv4) address, an Internet Protocol version 6 (IPv6) address, or combinations thereof.

9. A method for exchanging software defined networking (SDN) specific topology information for inter-domain routing, wherein the method comprises:
  generating a first link state packet (LSP) comprising SDN specific topology information of a local SDN domain, wherein the SDN specific topology information of the local SDN domain comprises an SDN identifier (ID) value that identifies the local SDN domain, an SDN member router ID list comprising a plurality of system IDs of routers in the local SDN domain, and a software defined networking controller (SDNC) address list comprising at least one address of an SDNC in the local SDN domain;
  sending the first LSP to a remote SDN domain via an inter-domain connection by employing an Intermediate System-to-Intermediate System (1S-IS) protocol;
  receiving a second LSP comprising SDN specific topology information of the remote SDN domain via the inter-domain connection by employing the IS-IS protocol; and
  determining a route for packet delivery via the local SDN domain and the remote SDN domain based on the SDN specific topology information of both SDN domains.

10. The method of claim 9, wherein the first LSP comprises an SDN identifier (ID) type-length-value (TLV) comprising:
  a code field that indicates the TLV is an SDN ID TLV;
  the SDN ID value that identifies the local SDN domain; and
  a length field that indicates a length of the SDN ID value.

11. The method of claim 9, wherein the first LSP comprises an SDN member router identifier (ID) list type-length-value (TLV) comprising:
  a code field that indicates the TLV is an SDN member router ID list TLV;
  the SDN member router ID list comprising a plurality of system IDs of routers in the local SDN domain; and
  a length field that indicates a length of the SDN member router ID list.

12. The method of claim 9, wherein the at least one address of the SDNC in the local SDN domain is an Internet Protocol version 4 (IPv4) address, and wherein the first LSP comprises a SDNC IPv4 address list type-length-value (TLV) comprising:
  a code field that indicates the TLV is an SDNC IPv4 address list TLV;
  the SDNC address list; and
  a length field that indicates a length of the SDNC IPv4 address list.

13. The method of claim 9, wherein the at least one address of the SDNC in the local SDN domain is an Internet Protocol version 6 (IPv6) address, and wherein the first LSP comprises a SDNC IPv6 address list type-length-value (TLV) comprising:
  a code field that indicates the TLV is an SDNC IPv6 address list TLV;
  the SDNC address list; and
  a length field that indicates a length of the SDNC IPv6 address list.

14. A method for exchanging software defined networking (SDN) specific topology information for inter-domain routing, wherein the method comprises:
    generating a first link state advertisement (LSA) comprising SDN specific topology information of a local SDN domain, wherein the SDN specific topology information comprises an SDN identifier (ID) value that identifies the local SDN domain, an SDN member router ID list comprising a plurality of system IDs of routers in the local SDN domain, and a software defined networking controller (SDNC) address list comprising a at least one address of an SDNC in the local SDN domain;
    sending the first LSA to a remote SDN domain via an inter-domain connection by employing an Open Shortest Path First (OSPF) protocol;
    receiving a second LSA comprising SDN specific topology information of the remote SDN domain via the inter-domain connection by employing the OSPF protocol; and
    determining a route for packet delivery via the local SDN domain and the remote SDN domain based on the SDN specific topology information of both SUN domains.

15. The method of claim 14, wherein the first LSA comprises an SDN ID sub-type-length-value (sub-TLV) comprising:
    a type field that indicates the sub-TLV is an SDN ID sub-TLV;
    the SDN ID value that identifies the local SDN domain; and
    a length field that indicates a length of the SDN ID value.

16. The method of claim 14, wherein the first LSA comprises an SDN member router identifier (ID) list sub-type-length-value (sub-TLV) comprising:
    a type field that indicates the sub-TLV is an SDN member router ID list sub-TLV;
    the SDN member router ID list comprising a plurality of member router IDs that identify routers in the local SDN domain; and
    a length field that indicates a length of the SDN member router ID list.

17. The method of claim 14, wherein the at least one address of the SDNC in the local SDN domain is an Internet Protocol version 4 (IPv4) address, and wherein the first LSA comprises a SDNC IPv4 address list sub-type-length-value (sub-TLV) comprising:
    a type field that indicates the sub-TLV is an SDNC IPv4 address list sub-TLV;
    the SDNC address list comprising at least one IPv4 address of the SDNC in the local SDN domain; and
    a length field that indicates a length of the SDNC IPv4 address list.

18. The method of claim 14, wherein the at least one address of the SDNC in the local SDN domain is an Internet Protocol version 6 (IPv6) address, and wherein the first LSA comprises a SDNC IPv6 address list encoded in a sub-type-length-value (sub-TLV) comprising:
    a type field that indicates the sub-TLV is an SDNC IPv6 address list sub-TLV;
    the SDNC address list comprising at least one IPv6 address of the SDNC in the local SDN domain; and
    a length field that indicates a length of the SDNC IPv6 address list.

19. The method of claim 14, wherein the first LSA is an Open Shortest Path First (OSPF) version 2 (OSPF v2) opaque LSA, an OSPF version 3 (OSPF v3) new LSA, or combinations thereof.

* * * * *

UNITED STATES PATENT AND TRADEMARK OFFICE
CERTIFICATE OF CORRECTION

PATENT NO. : 9,749,214 B2
APPLICATION NO. : 14/191121
DATED : August 29, 2017
INVENTOR(S) : Lin Han It is certified that error appears in the above-identified patent and that said Letters Patent is hereby corrected as shown below:

In the Claims

Column 14, Lines 63-67, through Column 15, Lines 1-29, Claim 1 should read:
1. A computer program product for use by a software defined networking controller (SDNC) associated with a local software defined networking (SDN) domain in an SDN interconnection network, wherein the computer program product comprises computer executable instructions stored on a non-transitory computer readable medium such that when executed by a processor cause the SDNC to:
    determine a first set of network devices and links in the local SDN domain for link state advertisement to a remote SDN domain in the SDN interconnection network;
    determine local SDN specific topology information of the local SDN domain, wherein the local SDN specific topology information comprises a local SDN member router identifier (ID) list that associates the first set of network devices with the local SDN domain, a local SDN ID that identifies the local SDN domain, a local SDNC address list comprising an address of at least one local SDNC in the local SDN domain, and wherein the address of the at least one local SDNC is an Internet Protocol version 4 (IPv4) address or an Internet Protocol version 6 (IPv6) address;
    determine a second set of network devices that are positioned at a border of the local SDN domain for communication with the remote SDN domain;
    receive a first message comprising remote SDN specific topology information of the remote SDN domain via an inter-domain connection and via at least one of the second network devices;
    direct a border network device included in the second set of network devices to advertise the local specific SDN topology information and link state advertisement to the remote SDN domain; and
    determine a route for packet delivery via the local SDN domain and the remote SDN domain based on the local SDN specific topology information and the remote SDN specific topology information.

Column 15, Lines 39-48, Claim 5 should read:
5. The computer program product of claim 1, wherein the remote SDN specific topology information comprises data describing less than all network devices and links of the remote SDN domain, and wherein determining the route comprises configuring a policy on the first set of network devices to Signed and Sealed this
Seventeenth Day of October, 2017

Joseph Matal
*Performing the Functions and Duties of the
Under Secretary of Commerce for Intellectual Property and
Director of the United States Patent and Trademark Office* treat the remote SDN domain as a single vertex in a shortest path first (SPF) calculation and performing the SPF to generate a routing tree that extends between one of the network devices in the local SDN domain and all network devices in the SDN interconnection network.

Column 16, Lines 3-6, Claim 8 should read:
8. The computer program product of claim 7, wherein the SDNC address list comprises at least one of an Internet Protocol version 4 (IPv4) address, an Internet Protocol version 6 (IPv6) address, or combinations thereof.

Column 17, Lines 1-23, Claim 14 should read:
14. A method for exchanging software defined networking (SDN) specific topology information for inter-domain routing, wherein the method comprises:
    generating a first link state advertisement (LSA) comprising SDN specific topology information of a local SDN domain, wherein the SDN specific topology information comprises an SDN identifier (ID) value that identifies the local SDN domain, an SDN member router ID list comprising a plurality of system IDs of routers in the local SDN domain, and a software defined networking controller (SDNC) address list comprising a at least one address of an SDNC in the local SDN domain;
    sending the first LSA to a remote SDN domain via an inter-domain connection by employing an Open Shortest Path First (OSPF) protocol;
    receiving a second LSA comprising SDN specific topology information of the remote SDN domain via the inter-domain connection by employing the OSPF protocol; and
    determining a route for packet delivery via the local SDN domain and the remote SDN domain based on the SDN specific topology information of both SDN domains.